Patented Apr. 20, 1954

2,676,183

UNITED STATES PATENT OFFICE 2,676,183

4a-METHYL-7 - ISOPROPYL-1,2,3,4,4a,9,10,10a-OCTAHYDRO-1-PHENANTHROL AND DERIVATIVES THEREOF

Willard M. Hoehn, Wilmette, Ill., assignor to G. D. Searle & Co., Chicago, Ill., a corporation of Illinois No Drawing. Application September 5, 1952, Serial No. 308,145

5 Claims. (Cl. 260—476)

This invention relates to a new group of polycyclic alcohols and their esters. Specifically it relates to 4a-methyl-7-isopropyl-1,2,3,4,4a,9,10,-10a-octahydro-1-phenanthrol and its esters. These compounds can be represented by the general structural formula

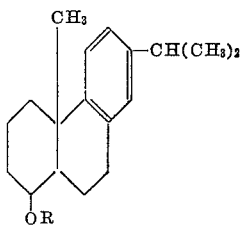

wherein OR is either a hydroxyl radical or a readily hydrolyzable acyloxy radical. Among the acyl radicals which R can represent are such lower alkanoyl radicals as acetyl, propionyl, butyryl, isobutyryl, pentanoyl, and hexanoyl as well as such aroyl groups as benzoyl and phenacetyl.

The 4a-methyl-7-isopropyl-1,2,3,4,4a,9,10,10a-octahydro-1-phenanthrol is conveniently prepared from 4a-methyl-7-isopropyl-1,2,3,4,4a,9,-10,10a-actahydro-1-phenanthrone (cf. Brassi et al., Helvetica Chimica Acta, vol. 33, pages 1730–1745 (1950)) by reduction with a metal hydride and, preferably, with an alkali metal aluminum hydride or alkali metal borohydride such as lithium aluminum hydride and sodium borohydride. This reduction can be carried out in lower dialkyl ethers, polyethers such as bis(β-ethoxyethyl)ether and cyclic ethers such as dioxane and tetrahydrofuran. In some cases it is preferable to use mixtures of the ether and such hydrocarbons as benzene, toluene or xylene in order to raise the reflux temperature. The reduction can also be carried out by hydrogenation in the presence of a noble metal catalyst.

The 1-acyloxy derivatives can be obtained conveniently by conventional methods of esterification of the hydroxyl group using such agents as acetyl chloride, acetic anhydride, propionyl chloride, butyryl bromide, succinyl chloride, maleic anhydride, benzoyl chloride, phenylacetyl bromide and the like.

This invention makes available valuable hormonal and, especially, esterogenic agents. The compounds claimed are valuable as intermediates in organic synthesis. For instance the carbinol can be converted to the alkali salt by treatment with an alkali metal such as lithium, sodium and potassium, and the resulting metallo derivative can be treated with an organic halide to produce the 1-ether. Among the suitable organic halides are the lower alkyl halides, aralkyl halides such as benzyl chloride and especially the dialkylaminoalkyl halides, and heterocyclylalkyl halides such as morpholinoalkyl halides, piperidinoalkyl halides, pyrrolidinoalkyl halides, piperazinoalkyl halides and the like which yield ethers of valuable medicinal properties, and particularly spasmolytics. The 9-methylene group can be converted to a carbonyl group by oxidation with chromic acid in acetic acid, after protection of the hydroxy group by an ether or acyl group. The free 1-carbinol group can be oxidized to the 1-carbonyl group by Oppenauer oxidation.

My invention will appear more fully in conjunction with the following examples which are set forth for illustration only and should not be construed as limiting it in spirit or in scope. In these examples temperatures are given uncorrected in degrees centrigrade (° C.), pressures in millimeters (mm.) of mercury, and quantities of material in parts by weight.

EXAMPLE 1

*4a - methyl - 7-isopropyl-1,2,3,4,4a,9,10,10a-octahydro-1-phenanthrol*

A solution of 21.5 parts of 4a-methyl-7-isopropyl - 1,2,3,4,4a,9,10,10a-octahydro-1-phenanthrone in 400 parts of anhydrous ether is added to a solution of 40 parts of lithium aluminum hydride in 280 parts of anhydrous ether. The mixture is heated at reflux temperature for three hours, allowed to stand overnight and refluxed 6 hours longer with stirring. The reaction mixture is then cooled in an ice water bath and treated by slow addition of 670 parts of ethyl acetate. After standing for 12 hours the reaction mixture is cooled and treated by slow addition of 550 parts of water. Precipitation of the inorganic material occurs within a short time after which the ether solution is separated, washed thoroughly with water, dried over anhydrous sodium sulfate, filtered and ether stripped under vacuum. The 4a-methyl-7-isopropyl - 1,2,3,4,4a,9,10,10a-octahydro-1-phenanthrol is distilled at about 132–134° C. and 0.05 mm. pressure. The infrared absorption spectrum indicates the disappearance of the ketonic group of the starting material which shows a maximum at 5.85 microns, and the presence of a hydroxyl group by a maximum at about 2.78 microns. The ultraviolet absorption spectrum shows a maximum at about 275 millimicrons and a molecular extinction coefficient of 690. The compound has the structural formula

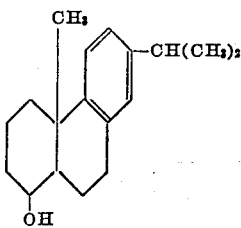

EXAMPLE 2

1 - acetoxy - 4a-methyl-7-isopropyl-1,2,3,4,4a,9,- 10,10a-octahydrophenanthrene A mixture of 10 parts of 4a-methyl-7-isopropyl-1,2,3,4,4a,9,10,10a-octahydro-1 - phenanthrol and 25 parts of pyridine is warmed to effect solution and then treated with 10 parts of acetic anhydride. The mixture is warmed at 80–90° C. for an hour and then poured into a solution of 120 parts of concentrated hydrochloric acid in 2500 parts of water containing 500 parts of ice. After warming to room temperature the mixture is ether extracted. This ether extract is washed with water, dilute sodium hydroxide solution and again with water, dried over anhydrous calcium sulfate, filtered and solvent stripped. The 1-acetoxy-4a-methyl - 7 - isopropyl - 1,2,3,4,4a,9,10,10a - octahydrophenanthrene is distilled at about 120–124° C. and 0.03–0.05 mm. pressure. The infrared absorption spectrum shows the presence of the ester group by maxima at 5.81 and 7.95 microns. A molecular extinction coefficient of 720 is found for the ultraviolet maximum observed at 276 millimicrons. The specific rotation $[\alpha]_D^{25}$ of an alcoholic solution is $+57.5\%$. The compound has the structural formula

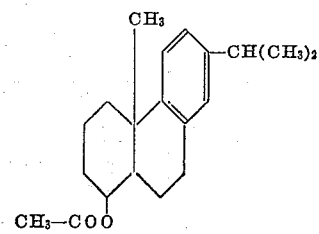

EXAMPLE 3

1-butanoyloxy-4a-methyl-7-isopropyl - 1,2,3,4,4a, 9,10,10a-octahydrophenanthrene A solution of 13 parts of 4a-methyl-7-isopropyl - 1,2,3,4,4a,9,10,10a - octahydro - 1 - phenanthrol in hot pyridine is treated with 20 parts of butyric anhydride and, after heating at 80–90° C. for 2 hours, the mixture is poured into a mixture of 250 parts of concentrated hydrochloric acid, 5000 parts of water and 100 parts of ice. After heating to room temperature the resulting mixture is extracted with ether and the ether extract is washed successively with water, dilute sodium hydroxide and again with water. The ether solution is dried over anhydrous potassium carbonate, filtered and evaporated to yield the 1-butanoyloxy-4a-methyl-7-isopropyl - 1,2,3,4,4a,9,10,10a - octahydrophenanthrene which is distilled at about 135–140° C. and 0.03–0.05 mm. pressure. It shows an ultraviolet maximum at about 275 millimicrons and has the structural formula

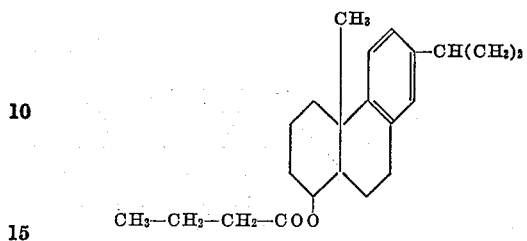

EXAMPLE 4

1-benzoyloxy-4a-methyl - 7 - isopropyl-1,2,3,4,4a, 9,10,10a-octahydrophenanthrene A pyridine solution of 5 parts of 4a-methyl-7-isopropyl-1,2,3,4,4a,9,10,10a-octahydro - 1 - phenanthrol is heated at 90° C. for an hour with 7 parts of benzoyl chloride, after which the mixture is poured on an iced dilute hydrochloric acid solution. The resulting mixture is extracted with ether and the ether extract is washed with water, dilute potassium carbonate solution and again with water. The extract is then dried over anhydrous calcium sulfate, filtered and evaporated to yield the 1-benzoyloxy-4a-methyl-7 - isopropyl - 1,2,3,4,4a,9,10,10a - octahydrophenanthrene as a light yellow, high boiling oil, which has the structural formula

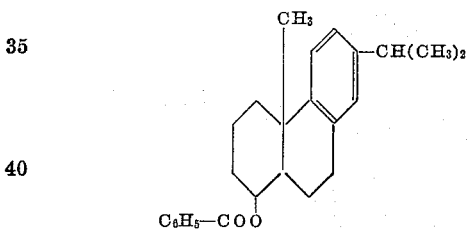

I claim:

1. The compounds of the structural formula

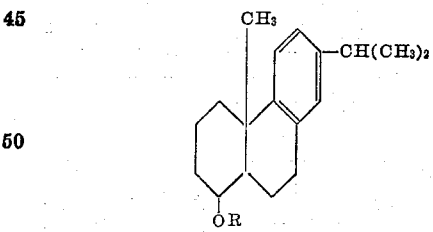

where R is a member of the class consisting of hydrogen, (lower alkyl)-CO—, benzoyl and (lower phenylalkyl)-CO— radicals.

2. 4a-methyl - 7 - isopropyl-1,2,3,4,4a,9,10,10a-octahydro-1-phenanthrol.

3. 1-(lower alkanoyloxy)-4a-methyl-7-isopropyl-1,2,3,4,4a,9,10,10a-octahydrophenanthrenes.

4. 1 - acetoxy - 4a - methyl-7-isopropyl-1,2,3, 4,4a,9,10,10a-octahydrophenanthrene.

5. 1-benzoyloxy-4a-methyl - 7 - isopropyl - 1,2, 3,4,4a,9,10,10a-octahydrophenanthrene.

No references cited.